No. 753,685.

Patented March 1, 1904.

UNITED STATES PATENT OFFICE.

EDWARD DREISS, OF SAN ANTONIO, TEXAS.

FOOD COMPOSITION.

SPECIFICATION forming part of Letters Patent No. 753,685, dated March 1, 1904.

Application filed August 29, 1902. Serial No. 121,540. (No pecimens.)

*To all whom it may concern:*

Be it known that I, EDWARD DREISS, of San Antonio, in the county of Bexar, State of Texas, have invented a new and useful Composition of Matter Relating to Food Products, of which the following is a complete specification.

The object of my invention is to produce a commercial food product resembling Italian paste or macaroni, but distinguished therefrom in its essential ingredients.

My composition consists of the following ingredients, combined in the proportions stated, as follows: best flour, preferably of wheat, two hundred pounds; Mexican chilli pepper, four pounds; Mexican cominos, four ounces; Mexican oregano, four ounces; garlic, one and one-fourth ounces; extract of beef, one-eighth pound; essence of celery, four ounces; water, substantially pure, about seven and one-half gallons.

The solid ingredients above specified after having been finely pulverized are thoroughly mixed, all of the ingredients being included in the initial mixing operation except the water. To insure the thorough mixing of the ingredients, and especially in the commercial manufacture of my compound, it is expedient to employ a suitable mixing-machine operated by power; but the use of machinery of this description for the purpose specified is well understood in the manufacture of similar products and requires no more in this place than the mere suggestion above offered.

After the mixing operation above specified is completed the water is gradually added until a stiff dough is made, which is then thoroughly kneaded and rolled, preferably on machines made for this purpose and of familiar use in the art, until the dough becomes perfectly smooth when cut by a knife.

The dough produced in the manner above specified when properly dried or cured constitutes my product ready for consumption; but to make it acceptable to the trade, and, indeed, to facilitate the drying and curing operation I prefer to prepare it in the form of vermicelli tubes or thimbles, which may be accomplished by any of the ordinary means employed in the manufacture of macaroni.

For example, a mass of dough is placed in a suitable hydraulic press, and being forced out through dies by hydraulic pressure may be made to assume the string-like form which is denominated "vermicelli," or the tubular form in which large macaroni is familiarly sold. The "thimbles," so called in the trade, consist of short sections of the tubes, each being about an inch in length. After the desired form is imparted to the dough the product is spread upon trays and is cured by drying in an airy space or room. After being cured in the manner specified the product becomes a hard brittle substance, which is not liable to be affected by climate, which can be packed and shipped like macaroni, and which when properly cooked or prepared for the table affords a dish of a peculiarly agreeable and distinctive relish.

The proportions of ingredients above specified are those which I prefer as giving comparatively satisfactory results, both with respect to the keeping qualities of the product and with respect to the requirements of taste; but it is obvious that the proportions of the flavoring materials and spices may be varied within a considerable range, thereby modifying in a variety of ways the taste or flavor of the article without materially departing from the scope of my invention.

What I claim is—

1. The herein-described composition of matter consisting of flour, Mexican chilli pepper, Mexican cominos, Mexican oregano, garlic, extract of beef, essence of celery and water, all combined substantially in the proportions and in the manner specified.

2. The herein-described composition of matter consisting of flour, Mexican chilli pepper, Mexican cominos, Mexican oregano, garlic, extract of beef, and essence of celery, all combined substantially in the proportions and in the manner specified.

In testimony of all which I have hereunto subscribed my name.

EDWARD DREISS.

Witnesses:
C. A. GOETH,
J. E. WEBB.